US010185560B2

(12) United States Patent
Vasilyev et al.

(10) Patent No.: US 10,185,560 B2
(45) Date of Patent: Jan. 22, 2019

(54) MULTI-FUNCTIONAL EXECUTION LANE FOR IMAGE PROCESSOR

(71) Applicant: Google LLC, Mountain View, CA (US)

(72) Inventors: Artem Vasilyev, Stanford, CA (US); Jason Rupert Redgrave, Mountain View, CA (US); Albert Meixner, Mountain View, CA (US); Ofer Shacham, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/591,955

(22) Filed: May 10, 2017

(65) Prior Publication Data

US 2017/0242695 A1    Aug. 24, 2017

Related U.S. Application Data

(63) Continuation of application No. 14/960,334, filed on Dec. 4, 2015, now Pat. No. 9,830,150.

(51) Int. Cl.
*G06F 9/30* (2018.01)
*G06F 7/57* (2006.01)
*G06F 15/80* (2006.01)

(52) U.S. Cl.
CPC .............. *G06F 9/3001* (2013.01); *G06F 7/57* (2013.01); *G06F 9/30014* (2013.01); *G06F 15/80* (2013.01)

(58) Field of Classification Search
CPC ....... G06F 9/3001; G06F 9/3885; G06F 15/80
See application file for complete search history.

(56) References Cited

U.S. PATENT DOCUMENTS

| 4,445,177 A | 4/1984 | Bratt et al. |
| 4,935,894 A | 6/1990 | Ternes et al. |

(Continued)

FOREIGN PATENT DOCUMENTS

| CN | 103793195 | 5/2014 |
| CN | 104025034 | 9/2014 |

(Continued)

OTHER PUBLICATIONS

Vangal et al., "An 80-Tile Sub-100-W TeraFLOPS Processor in 65-nm CMOS", 2008, IEEE. (Year: 2008).*

(Continued)

*Primary Examiner* — Benjamin P Geib
(74) *Attorney, Agent, or Firm* — Fish & Richardson P.C.

(57) ABSTRACT

An apparatus is described that includes an execution unit having a multiply add computation unit, a first ALU logic unit and a second ALU logic unit. The ALU unit is to perform first, second, third and fourth instructions. The first instruction is a multiply add instruction. The second instruction is to perform parallel ALU operations with the first and second ALU logic units operating simultaneously to produce different respective output resultants of the second instruction. The third instruction is to perform sequential ALU operations with one of the ALU logic units operating from an output of the other of the ALU logic units to determine an output resultant of the third instruction. The fourth instruction is to perform an iterative divide operation in which the first ALU logic unit and the second ALU logic unit operate during to determine first and second division resultant digit values.

19 Claims, 8 Drawing Sheets

(56) References Cited

U.S. PATENT DOCUMENTS

| | | |
|---|---|---|
| 5,253,308 A | 10/1993 | Johnson |
| 5,258,944 A | 11/1993 | Smith |
| 5,426,600 A | 6/1995 | Nakagawa et al. |
| 5,612,693 A | 3/1997 | Craft et al. |
| 5,751,618 A | 5/1998 | Shigeshi et al. |
| 5,751,864 A | 5/1998 | Moriwake et al. |
| 5,892,962 A | 4/1999 | Cloutier |
| 6,049,859 A | 4/2000 | Gliese et al. |
| 6,366,289 B1 | 4/2002 | Johns |
| 6,587,158 B1 | 7/2003 | Adams et al. |
| 6,728,862 B1 | 4/2004 | Wilson |
| 6,745,319 B1 | 6/2004 | Balmer et al. |
| 6,970,196 B1 | 11/2005 | Ishikawa et al. |
| 7,010,177 B1 | 3/2006 | Mattison |
| 7,167,890 B2 | 1/2007 | Lin et al. |
| 7,200,287 B2 | 4/2007 | Fukuda et al. |
| 7,286,717 B2 | 10/2007 | Nomizu |
| 7,583,851 B2 | 9/2009 | Kudo et al. |
| 7,941,634 B2 | 5/2011 | Georgi et al. |
| 8,156,284 B2 | 4/2012 | Vorback et al. |
| 8,321,849 B2 | 11/2012 | Nickolls et al. |
| 8,436,857 B2 | 5/2013 | Twilleager |
| 8,508,612 B2 | 8/2013 | Cote et al. |
| 8,543,843 B1 | 9/2013 | Cheng et al. |
| 8,631,205 B1 * | 1/2014 | Wentzlaff ............ G06F 12/0813 711/119 |
| 8,650,384 B2 | 2/2014 | Lee et al. |
| 8,749,667 B2 | 6/2014 | Noraz et al. |
| 8,786,614 B2 | 7/2014 | Curry et al. |
| 8,797,323 B2 | 8/2014 | Salvi et al. |
| 8,823,736 B2 | 9/2014 | Barringer et al. |
| 8,970,884 B2 | 3/2015 | Tsuji et al. |
| 8,976,195 B1 | 3/2015 | Lindhom et al. |
| 2005/0270412 A1 | 12/2005 | Kamon et al. |
| 2006/0044576 A1 | 3/2006 | Tabata et al. |
| 2006/0212678 A1 * | 9/2006 | De Oliveira Kastrup Pereira ...... G06F 9/3824 712/11 |
| 2007/0047828 A1 | 3/2007 | Ishii et al. |
| 2007/0080969 A1 | 4/2007 | Yamaura |
| 2007/0156729 A1 | 7/2007 | Shaylor |
| 2008/0111823 A1 | 5/2008 | Fan et al. |
| 2008/0244222 A1 | 10/2008 | Supalov et al. |
| 2009/0002390 A1 | 1/2009 | Kuno |
| 2009/0228677 A1 | 9/2009 | Liege |
| 2009/0300621 A1 | 12/2009 | Mantor et al. |
| 2009/0317009 A1 | 12/2009 | Ren |
| 2010/0122105 A1 | 5/2010 | Arslan et al. |
| 2010/0188538 A1 | 7/2010 | Sugawa et al. |
| 2011/0055495 A1 | 3/2011 | Wolford et al. |
| 2011/0087867 A1 | 4/2011 | Jacobson et al. |
| 2011/0125768 A1 | 5/2011 | Shibao |
| 2011/0153925 A1 | 6/2011 | Bains et al. |
| 2012/0320070 A1 | 12/2012 | Arvo |
| 2013/0027416 A1 | 1/2013 | Vaithianathan et al. |
| 2013/0202051 A1 | 8/2013 | Zhou |
| 2013/0219225 A1 | 8/2013 | Ito et al. |
| 2013/0243329 A1 | 9/2013 | Oro Garcia et al. |
| 2013/0314428 A1 | 11/2013 | Chen et al. |
| 2013/0318544 A1 | 11/2013 | Kuroda et al. |
| 2014/0028876 A1 | 1/2014 | Mills |
| 2014/0136816 A1 | 5/2014 | Krig |
| 2014/0282611 A1 | 9/2014 | Campbell et al. |
| 2015/0106596 A1 | 4/2015 | Vorbach et al. |
| 2016/0219225 A1 | 7/2016 | Zhu et al. |
| 2016/0313980 A1 | 10/2016 | Meixner et al. |
| 2016/0313984 A1 | 10/2016 | Meixner et al. |
| 2016/0313999 A1 | 10/2016 | Meixner |
| 2016/0314555 A1 | 10/2016 | Zhu et al. |
| 2016/0316094 A1 | 10/2016 | Meixner et al. |
| 2016/0316107 A1 | 10/2016 | Shacham et al. |
| 2016/0316157 A1 | 10/2016 | Desai et al. |

FOREIGN PATENT DOCUMENTS

| | | |
|---|---|---|
| CN | 104603766 | 5/2015 |
| EP | 0293701 | 12/1988 |
| JP | 2013090070 | 5/2013 |
| TW | 201510861 | 3/2015 |
| TW | 201531946 | 8/2015 |
| WO | 9409595 | 4/1994 |
| WO | 2007071883 | 6/2007 |

OTHER PUBLICATIONS

International Preliminary Report on Patentability issued in International Application No. PCT/US2016/057771, dated Jun. 14, 2018, 8 pages.

"ChimeraTM: The NVIDIA Computational Photography Architecture" Whitepaper, NVIDIA Corporation 2013, 15 pages.

"Multioutput Scaler Reference Design" Altera Corporation, Application Note AN-648-1.0, Aug. 2012, 18 pages.

Adams, et al. "The Frankencamera: An Experimental Platform for Computational Photography", ACM Transactions on Graphics, vol. 29, No. 4, Article 29, Publication Jul. 2010, 12 pages.

Ahn, et al., "Evaluating the Image Stream Architecture." In ACM SIGARCH Computer Architecture News, vol. 32, No. 2, IEEE Computer Society, Jun. 2004, 14 pages.

Arasan "Silicon Hive Announces New Image Signal Processor", Eindhoven, the Netherlands, May 16, 2006, http://www.design-reuse.com/news/13362/silicon-hive-iomage-signal-processor.html, 3 pages.

Balfour, et al., "An Energy-Efficient Processor Architecture for Embedded Systems" IEEE Computer Architecture Letters 7, No. 1 p. 29-32, May 2008.

Barry, et al., "Always-On Vision Processing Unit for Mobile Applications", IEEE Micro, Mar./Apr. 2015, pp. 56-66.

Bolotoff, Paul V., "Alpha—The History in Facts and Comments" http://alasir.com/articles/a;pha_history/alpha_21164_21164pc.html, Last modification date Apr. 22, 2007,5 paqes.

Brunhaver, John S. "Design and Optimization of a Stencil Engine", Stanford University, Jun. 2015, 133 pages.

Bushey, et al., "Flexible Function-Level Acceleration of Embedded Vision Applications Using the Pipelined Vision Processor." In Signals, Systems and Computers, 2013 Asilomar Conference, pp. 1447-1452, IEEE, 2013.

Cardells-Tormo et al., "Area-efficient 2-D Shift-variant Convolvers for FPGA-based Digital Image Processing," IEEE Workshop on Signal Processing Systems Design and Implementation, Nov. 2, 2005, 5 pages.

CEVA-MM3101: An Imaging-Optimized DSP Core Swings for an Embedded Vision Home Run http://www.bdti.com/insideDSP/2012/01/24/CEVA, Jan. 19, 2012, 3 pages.

Chao et al., "Pyramid Architecture for 3840×2160 Quad Full High Definition 30 Frames/s Video Acquisition," IEEE Transactions on Circuits and Systems for Video Technology, Nov. 1, 2010, 10 pages.

Chen et al., "CRISP: Coarse-Grained Reconfigurable Image Stream Processor for Digital Still Cameras and Camcorders," IEEE Transactions on Circuits and Systems for Video Technology, Sep. 2008, 14 pages.

Chen, et al., "DaDianNao: A Machine-Learning Supercomputer." 47m Annual IEEE/ACM International Symposium, pp. 609-622, IEEE, Dec. 2014.

Chenyun, et al., "A Paradigm Shift in Local Interconnect Technology Design in the Era of Nanoscale Multigate and Gate-All-Around Devices," IEEE Electron Device Letters, vol. 36, No. 3, pp. 274-26, Mar. 2015.

Clearspeed Whitepaper: CSX Processor Architecture, www.clearspeed corn, 2007, 16 pages.

Codrescu, et al., "Hexagon DSP: An Architecture Optimized for Mobile Multimedia and Communications." IEEE Micro vol. 34, Issue 2, pp. 34-43, Mar. 2014.

Dally, William J., "Computer architecture is all about interconnect." Proceedings of 8th International Symposium High-Perf. Comp. Architecture, Feb. 2002, 11 pages.

(56) References Cited

OTHER PUBLICATIONS de Dinechin, et al., "A Clustered Manycore Processor Architecture for Embedded and Accelerated Applications." In High Performance Extreme Computing Conference (HPEC), IEEE, pp. 1-6, Sep. 2013.
DeVito, et al., "Terra: A Multi-Stage Language for High-Performance Computing", PLDl'13, Jun. 16-22, 2013, Seattle, Washington, 11 pages.
DeVito, et al.,"First-class Runtime Generation of High-Performance Types using Exotypes", PLDl'14, Jun. 9-11, ACM, 12 pages.
Dykes et al., "Communication and Computation Patterns of Large Scale Image Convolutions on Parallel Architectures," Parallel Processing Symposium, Jan. 1, 1994, 6 pages.
Eichenberger, et al., "Optimizing Compiler for the Cell Processor" PACT, Tuesday, Sep. 20, 2005, Part 1, pp. 1-16.
Eichenberger, et al., "Optimizing Compiler for the Cell Processor" PACT, Tuesday, Sep. 20, 2005, Part 2, pp. 17-32.
EyeQ2TM, "Vision System on a Chip", Mobileye, Sep. 2007, 4 pages.
Farabet, et al., "Hardware Accelerated Convolutional Neural Networks for Synthetic Vision Systems." Proceedings of 2010 IEEE International Symposium, pp. 257-260, Jun. 2010.
Farabet, et al., "Neuflow: A Runtime Reconfigurable Dataflow Processor for Vision." IEEE Computer Society Conference, pp. 109-116, Jun. 2011.
Galal, et al., "FPU Generator for Design Space Exploration." 21st IEEE Symposium on Computer Arithmetic (ARITH), Apr. 2013, 10 pages.
Gentile, et al., "Image Processing Chain for Digital Still Cameras Based on SIMPil Architecture." ICCP International Conference Workshops, pp. 215-222, IEEE, Jun. 2005.
Goldstein, et al., "PipeRench: A Coprocessor for Streaming Multimedia Acceleration", Carnegie Mellow University, Research Showcase @CMU, Appears in the 26th Annual International Symposium on Computer Architecture, May 1999, Atlanta, Georgia, 14 paqes.
Gupta, et al., "A VLSI Architecture for Updating Raster-Scan Displays", Computer Graphics, vol. 15, No. 3, Aug. 1981, pp. 71-78.
Hameed, et al., "Understanding Sources of Inefficiency in General-Purpose Chips." ACM SIGARCH Computer Architecture News, vol. 38, No. 3, pp. 37-47, 2010.
Hanrahan, Pat, "Domain-Specific Languages for Heterogeneous GPU Computing", NVIDIA Technology Conference, Oct. 2, 2009, 30 pages.
Hegarty, et al., "Darkroom: Compiling High-Level Image Processing Code into Hardware Pipelines", Proceedings of ACM SIGGRAPH, Jul. 2014, 11 pages.
Henretty, et al., "A Stencil Compiler for Short-Vector SIMD Architectures", ACM, ICS'13, Jun. 10-14, 2013, Eugene, Oregon, pp. 13-24.
Horowitz, Mark, "Computing's Energy Problem: (and what we can do about it)", IEEE, International Solid-State Circuits Conference 2014, 46 pages.
Kapasi, et al. "The Imagine Stream Processor", IEEE, International Conference on Computer Design: VLSI in Computers and Processors (ICCD'02), 2002, 17 pages.
Khailany, et al., "A Programmable 512 GOPS Stream Processor for Signal, Image, and Video Processing", IEEE Journal of Solid-State Circuits, vol. 43, No. 1, pp. 202-213, Jan. 2008.
Khawam, et al., "The Reconfigurable Instruction Cell Array", IEEE Transactions on Very Large Scale Integration (VLSI) Systems, vol. 16, No. 1, Jan. 2008, pp. 75-85.
Khronos, SPIR 2.0 "Provisional Specification to Enable Compiler Innovation on Diverse Parallel Architectures", Aug. 11, 2014, 2 pages.
Levinthal, "Parallel Computers for Graphics Applications", ACM, 1987, pp. 193-198.
Levinthal, et al., "Chap-A SIMD Graphics Processor", Computer Graphics, vol. 18, No. 3, Jul. 1984, pp. 77-82.

M.J. Duff, "CLIP 4: A Large Scale Integrated Circuit Array Parallel Processor," Proc. IEEE lnt'I Joint Conf. Pattern Recognition, . . . Jan. 2004, pp. 728-733.
Mandal, et al., "An Embedded Vision Engine (EVE) for Automotive Vision Processing." In Circuits and Systems (ISCAS), 2014 IEEE Symposium, pp. 49-52, IEEE, 2014.
Mcintosh-Smith, "A Next-Generation Many-Core Processor With Reliability, Fault Tolerance and Adaptive Power Management Features Optimized for Embedded and High Performance Computing Applications" in Proceedings of the High Performance Embedded ComputinQ Conference (HPEC) 2008, paQes 1-2, 5.
Mody, et al., "High Performance and Flexible Imaging Sub-System." In Advances in Computing, Communications and Informatics (ICACCI), 2014 International Conference, pp. 545-548. IEEE, 2014.
Molnar, et al., "PixelFlow: High-Speed Rendering Using Image Composition" proceedings of Siggraph 92, Computer Graphics, 26, Jul. 2, 1992, 10 pages.
Moloney, David, "1 TOPS/W Software Programmable Media Processor." Hot Chips 23 Symposium (HCS), IEEE, Aug. 2011, 24 pages.
Moloney, et al., "Myriad 2: Eye of the Computational Vision Storm", Hot Chips 26 Symposium (HCS), IEEE, Aug. 2014, 18 pages.
MPPA—MANYCORE, Product Family Overview http://www.kalray.eu/IMG/pdf/FLYER_MPPA_MANYCORE-4.pdf Feb. 2014, 2 pages.
Nightingale, Edmund B., et al., "Helios: Heterogeneous Multiprocessing with Satellite Kernels," SOSP '09, Oct. 11-14, 2009, Big Sky, Montana, U.S.A., (Oct. 11, 2009), 14 paqes.
NVIDIA—NVIDIA's Next Generation CUDA™ Compute Architecture: Kepler™,GK110/210, 2014, 23 pages, http://international.download.nvidia.com/pdf/kepler/NVIDIA-Kepler-GK110-GK210-Architecture-Whitepaper.pdf.
NVIDIA Tegra K1—A New Era in Mobile Computing—Whitepapers—Jan. 2014, 26 pages.
NVIDIA Tegra X1—NVIDIA's New Mobile Superchip—Whitepapers—Jan. 2015, 41 pages.
NVIDIA, "PTX:Parallel Thread Execution ISA Version 1.4", Aug. 23, 2010, 135 pages.
Olofsson, et al., "A 25 GFLOPS/Watt Software Programmable Floating Point Accelerator" High Performance Embedded Computing Conference, 201 0, 2 pages.
Oosterhout, Optimized Pixel Template Image Correlator, Master Thesis, Aug. 19, 1992, 74 pages.
Parker, Richard, "Embedding Computer Vision in Electronic Devices: How New Hardware and Software Choices Have Changed the Designer's Approach", Future Technology Magazine, pp. 22-23, Feb. 2013.
PCT/US2016/057771—International Search Report and Written Opinion, dated Nov. 1, 2016, 11 pages.
Pelc, Oscar, Multimedia Support in the i.MX31 and i.MX31L Applications Processors, Freescale Semiconductor, Inc. Feb. 2006, http://cache.freescale.com/files/32bit/doc/white_paper/IMX31MULTIWP.pdf, 12 pages.
Pham, et al., "NeuFlow: Dataflow Vision Processing System-On-A-Chip." IEEE 55m International Midwest Symposium, Aug. 2012, 4 pages.
Qadeer, et al., "Convolution Engine: Balancing Efficiency & Flexibility in Specialized Computing", ISCA '13 Tel-Aviv, Israel, ACM 2013, pp. 24-35.
Ragan-Kelley et al., "Halide: A Language and Compiler for Optimizing Parallelism, Locality, and Recomputation in Image Processing Pipelines," Jun. 16, 2013, 12 pages.
S.F. Reddaway,"DAP—A Distributed Processor Array", ISCA '73 Proceedings of the First Ann. Symposium on Computer Architecture, pp. 61-65.
SCP2200: Image Cognition Processors Family [Product Brief]*, http://www.element14.com/community/docs/DOC-50990, Oct. 26, 2012, 2 pages.
SCP2200: Image Cognition Processors*, http://www.element14.com/community/docs/DOC-50984/I/scp2200-image-cognition-processors, Oct. 25, 2012, 2 pages.

(56) References Cited

OTHER PUBLICATIONS

Sedaghati, et al., "SIVEC: A Vector Instruction Extension for High Performance Stencil Computation," Parallel Architectures and Compilation Techniques, Oct. 10, 2011, 12 pages.
SemiWiki.com—New CEVA-ZM4 Vision IP Does Point clouds and and More: Published Feb. 27, 2015, https://www.semiwiki.com/forum/content/4354-new-ceva-xm4-vision-ip-does-point-clouds-more.html.
Shacham, et al. "Smart Memories Polymorphic Chip Multiprocessor", Proceedings of the 46$^{th}$ Design Automation Conference (OAC), San Francisco, CA, Jul. 2009.
Shacham, et al., "Rethinking Digital Design: Why Design Must Change", IEEE micro Magazine, Nov./Dec. 2010.
Shacham, Ofer, "Chip Multiprocessor Generator: Automatic Generation of Custom and Heterogeneous Complete Platforms" Dissertation—Stanford University, May 2011, 190 pages. Part 1.
Shacham, Ofer, "Chip Multiprocessor Generator: Automatic Generation of Custom and Heterogeneous Complete Platforms" Dissertation—Stanford University, May 2011, 190 pages. Part 2.
Silicon Hive: "Silicon System Design of Media and Communications Applications", Jun. 13, 2007, 22 pages.
Spampinato, et al., "A Basic Linear Algebra Compiler", ACM, CG0'14, Feb. 15-19, 2014, Orlando Fl, pp. 23-32.
SPIR, The SPIR Specification, Version 2.0, Revision Date Jun. 5, 2014, 40 pages.
Stein, et al., "A Computer Vision System on a Chip: A Case Study From the Automotive Domain." IEEE Computer Society Conference, p. 130, 2005.
Stojanov, et al., "Abstracting Vector Architectures in Library Generators: Case Study Convolution Filters", Array 14, ACM, Jun. 11, 2014, UK, pp. 14-19.
Stream Processors, Inc. Announces Storm-1 Family of Data-Parallel Digital Signal Processors, ISSCC 2007, Feb. 12, 2007, 3 pages. http://www/businesswire.com/news/home/20070212005230/en3Stream-Processors-Announces-Storm-1-Family-Data-Parallel-Digital.
Stream Processors, Inc., Company History—Foundational Work in Stream Processing initiated in 1995 http://en.wikipedia.org/wiki/Stream_processors._inc., 5 pages.
Tanabe, et al., "Visconti: multi-VLIW image Recognition Processor Based on Configurable Processor [obstacle detection applications]", Custom Integrated Circuits Conference, IEEE, 2003, http://ieeexplore.ieee.org/document/1249387?arnumber=1249387&tag=1.
Van der Wal, et al., "The Acadia Vision Processor", IEEE proceedings of International Workshop on Computer Applications for Machine Perception, Sep. 2000, http://Citeseerx.ist.psu.edu/viewdoc.downoad?doi=10.1.1.32.3830&rep=rep1&type=pdf, 10 pages.
Wahib et al., "Scalable Kernel Fusion for Memory-Bound GPU Applications," SC14: International Conference for High Performance Computing, Networking, Storage and Analysis, Nov. 16, 2014, 12 pages.
Yu et al., "Optimizing Data Intensive Window-based Image Processing on reconfigurable Hardware Boards," Proc. IEEE Workshop on Signal Processing System Design and Implementation, Nov. 2, 2005, 6 pages.
Zhou, Minhua, et al., "Parallel Tools in HEVC for High-Throughput Processing," Applications of Digital Processing, XXXV, Proc. of SPI, vol. 8499, (Jan. 1, 2012), pp. 1-13.

* cited by examiner

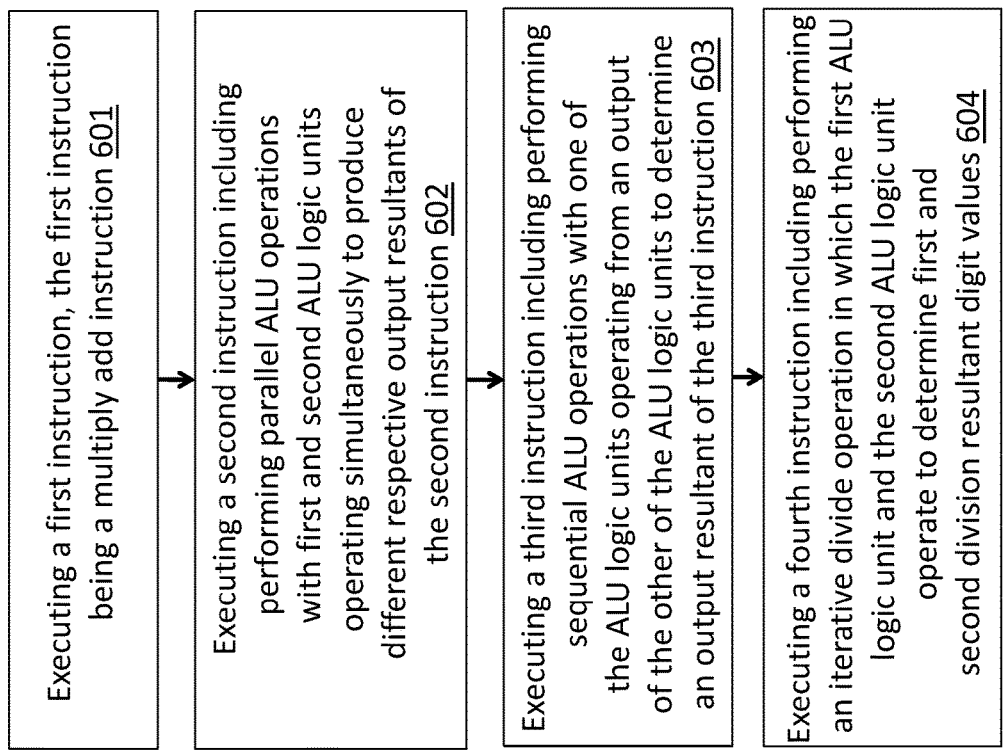

MULTI-FUNCTIONAL EXECUTION LANE FOR IMAGE PROCESSOR

CROSS REFERENCE TO RELATED APPLICATIONS

This application is a continuation of and claims priority to U.S. patent application Ser. No. 14/960,334, filed on Dec. 4, 2015, the entire contents of which are hereby incorporated by reference.

FIELD OF INVENTION

The field of invention pertains generally to the computing sciences, and, more specifically, to a multi-functional execution lane for an image processor.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hard-wired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

An apparatus is described that includes an execution unit having a multiply add computation unit, a first ALU logic unit and a second ALU logic unit. The ALU unit is to perform first, second, third and fourth instructions. The first instruction is a multiply add instruction. The second instruction is to perform parallel ALU operations with the first and second ALU logic units operating simultaneously to produce different respective output resultants of the second instruction. The third instruction is to perform sequential ALU operations with one of the ALU logic units operating from an output of the other of the ALU logic units to determine an output resultant of the third instruction. The fourth instruction is to perform an iterative divide operation in which the first ALU logic unit and the second ALU logic alternatively operate during an iteration to determine a quotient digit value.

An apparatus is described comprising an execution unit of an image processor. The ALU unit comprises means for executing a first instruction, the first instruction being a multiply add instruction. The ALU unit comprises means for executing a second instruction including performing parallel ALU operations with first and second ALU logic units operating simultaneously to produce different respective output resultants of the second instruction. The ALU unit comprises means for executing a third instruction including performing sequential ALU operations with one of the ALU logic units operating from an output of the other of the ALU logic units to determine an output resultant of the third instruction. The ALU unit comprises means for executing a fourth instruction including performing an iterative divide operation in which the first ALU logic unit and the second ALU logic unit operate to determine first and second digit resultant digit values.

FIGURES

The following description and accompanying drawings are used to illustrate embodiments of the invention. In the drawings:

FIG. 6 shows a methodology performed by the execution lane described with respect to FIGS. 3 through 5a,b;

DETAILED DESCRIPTION

Figure 1:
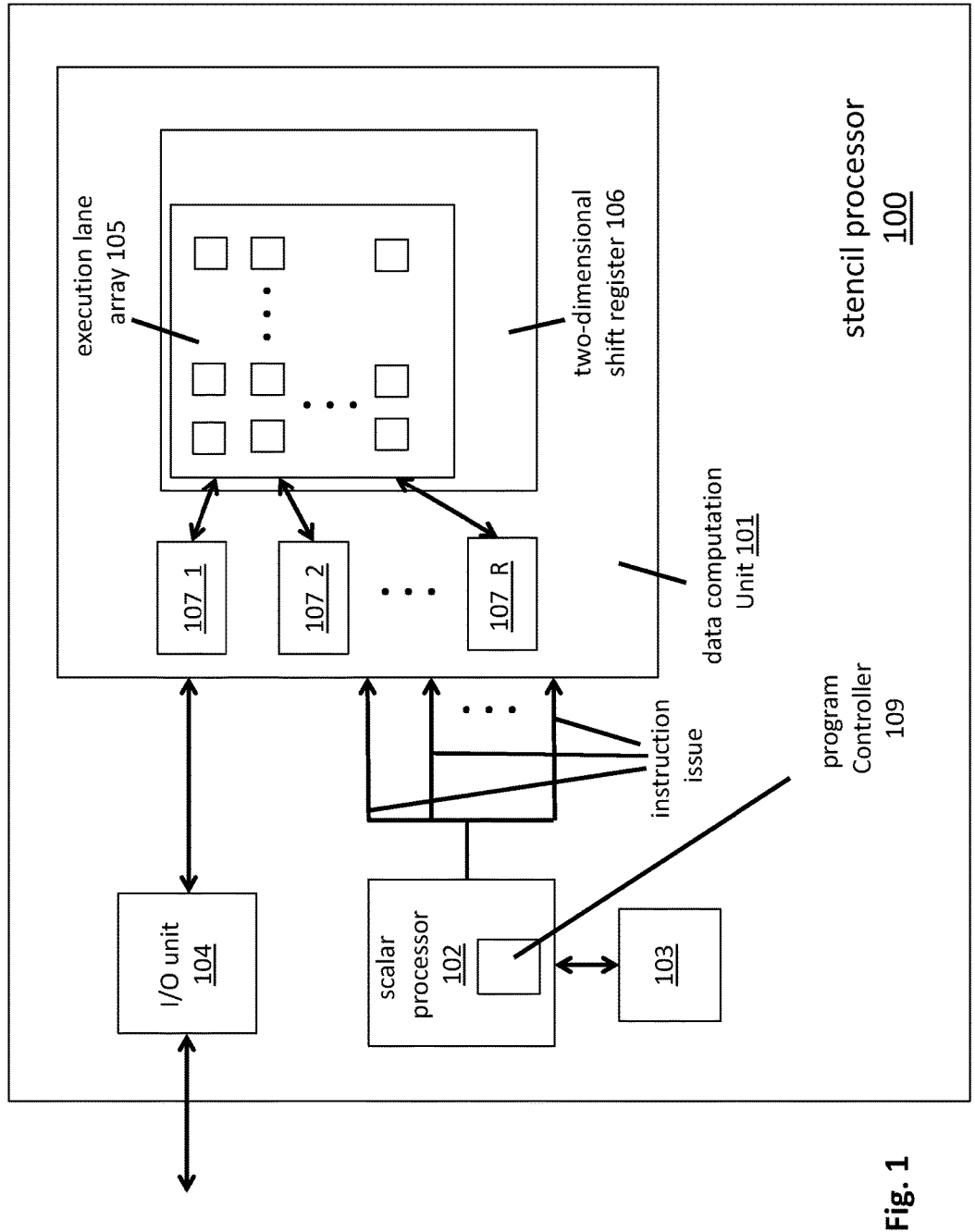
FIG. 1 shows a stencil processor component of an image processor.

FIG. 1 shows an embodiment of a stencil processor architecture 100. A stencil processor, as will be made more clear from the following discussion, is a processor that is optimized or otherwise designed to process stencils of image data. One or more stencil processors may be integrated into an image processor that performs stencil based tasks on images processed by the processor. As observed in FIG. 1, the stencil processor includes a data computation unit 101, a scalar processor 102 and associated memory 103 and an I/O unit 104. The data computation unit 101 includes an array of execution lanes 105, a two-dimensional shift array structure 106 and separate random access memories 107 associated with specific rows or columns of the array.

The I/O unit 104 is responsible for loading input "sheets" of image data received into the data computation unit 101 and storing output sheets of data from the data computation unit externally from the stencil processor. In an embodiment, the loading of sheet data into the data computation unit 101 entails parsing a received sheet into rows/columns of image data and loading the rows/columns of image data into the two dimensional shift register structure 106 or respective random access memories 107 of the rows/columns of the execution lane array (described in more detail below).

If the sheet is initially loaded into memories 107, the individual execution lanes within the execution lane array 105 may then load sheet data into the two-dimensional shift register structure 106 from the random access memories 107 when appropriate (e.g., as a load instruction just prior to operation on the sheet's data). Upon completion of the loading of a sheet of data into the register structure 106 (whether directly from a sheet generator or from memories 107), the execution lanes of the execution lane array 105 operate on the data and eventually "write back" finished data externally from the stencil processor, or, into the random access memories 107. If the later the I/O unit 104 fetches the data from the random access memories 107 to form an output sheet which is then written externally from the stencil processor.

The scalar processor 102 includes a program controller 109 that reads the instructions of the stencil processor's program code from instruction memory 103 and issues the instructions to the execution lanes in the execution lane array 105. In an embodiment, a single same instruction is broadcast to all execution lanes within the array 105 to effect a SIMD-like behavior from the data computation unit 101. In an embodiment, the instruction format of the instructions read from scalar memory 103 and issued to the execution lanes of the execution lane array 105 includes a very-long-instruction-word (VLIW) type format that includes more than one opcode per instruction. In a further embodiment, the VLIW format includes both an ALU opcode that directs a mathematical function performed by each execution lane's ALU and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 105).

The combination of an execution lane array 105, program controller 109 and two dimensional shift register structure 106 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

During operation, because of the execution lane array 105 and two-dimensional shift register 106, multiple stencils of an image can be operated on in parallel (as is understood in the art, a stencil is typically implemented as a contiguous N×M or N×M×C group of pixels within an image (where N can equal M)). Here, e.g., each execution lane executes operations to perform the processing for a particular stencil worth of data within the image data, while, the two dimensional shift array shifts its data to sequentially pass the data of each stencil to register space coupled to the execution lane that is executing the tasks for the stencil. Note that the two-dimensional shift register 106 may also be of larger dimension than the execution lane array 105 (e.g., if the execution lane array is of dimension X×X, the two dimensional shift register 106 may be of dimension Y×Y where Y>X). Here, in order to fully process stencils, when the left edge of the stencils are being processed by the execution lanes, the data in the shift register 106 will "push out" off the right edge of the execution lane array 105. The extra dimension of the shift register 106 is able to absorb the data that is pushed off the edge of the execution lane array.

Apart from acting as a data store for image data being operated on by the execution lane array 105, the random access memories 107 may also keep one or more look-up tables. In various embodiments one or more scalar look-up tables may also be instantiated within the scalar memory 103.

A scalar look-up involves passing the same data value from the same look-up table from the same index to each of the execution lanes within the execution lane array 105. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 105 during the same clock cycle.

Figure 2:
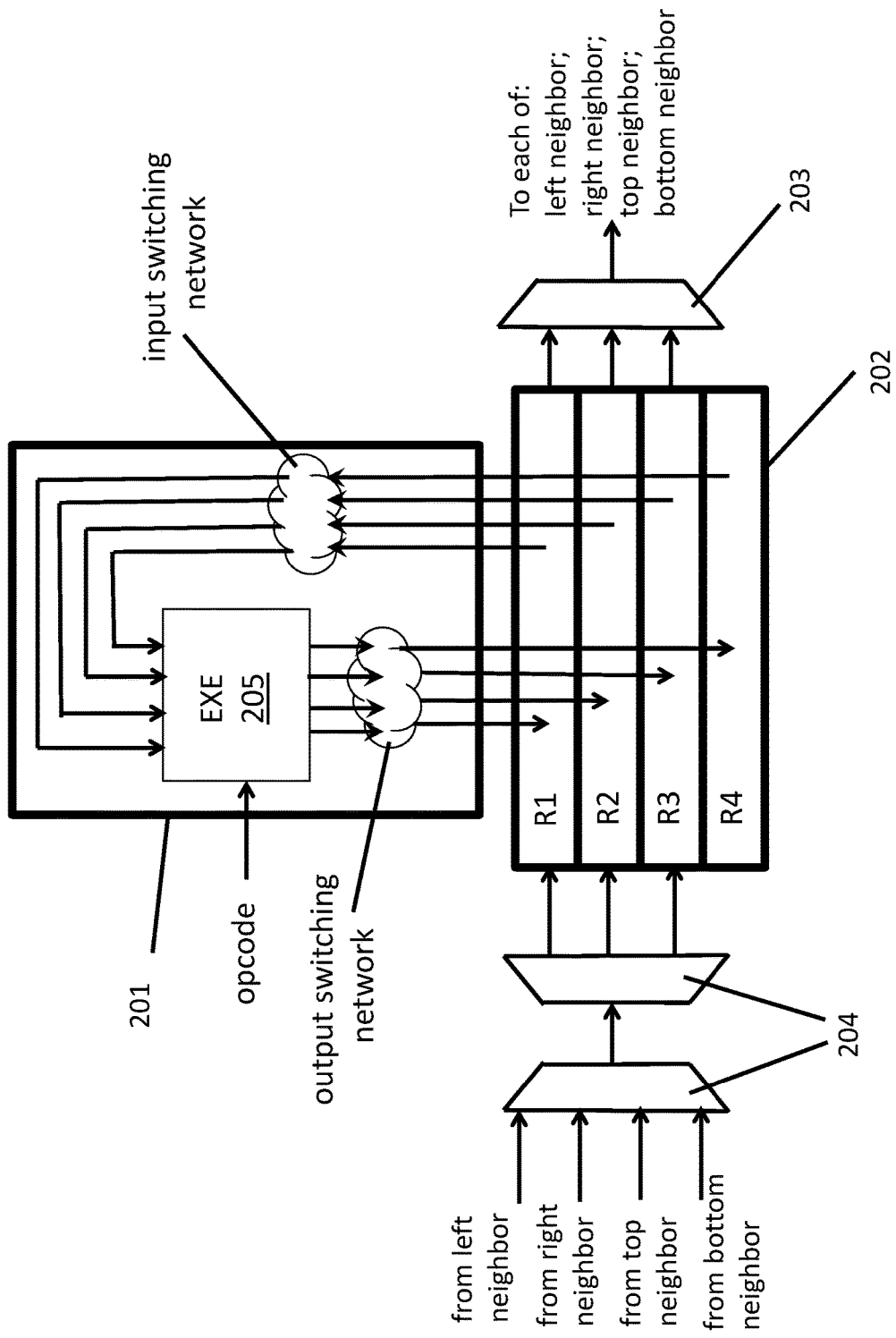
FIG. 2 shows an instance of an execution lane and its coupling to a two dimensional shift register.

FIG. 2 shows another, more detailed depiction of the unit cell for an ALU execution unit 205 within an execution lane 201 and corresponding local shift register structure. The execution lane and the register space associated with each location in the execution lane array is, in an embodiment, implemented by instantiating the circuitry observed in FIG. 2 at each node of the execution lane array. As observed in FIG. 2, the unit cell includes an execution lane 201 coupled to a register file 202 consisting of four registers R1 through R4. During any cycle, the ALU execution unit may read from any of registers R1 through R4 and write to any of registers R1 through R4.

In an embodiment, the two dimensional shift register structure is implemented by permitting, during a single cycle, the contents of any of (only) one of registers R1 through R3 to be shifted "out" to one of its neighbor's register files through output multiplexer 203, and, having the contents of any of (only) one of registers R1 through R3 replaced with content that is shifted "in" from a corresponding one if its neighbors through input multiplexers 204 such that shifts between neighbors are in a same direction (e.g., all execution lanes shift left, all execution lanes shift right, etc.). In various embodiments, the execution lanes themselves execute their own respective shift instruction to effect a large scale SIMD two-dimensional shift of the shift register's contents. Although it may be common for a same register to have its contents shifted out and replaced with content that is shifted in on a same cycle, the multiplexer arrangement 203, 204 permits for different shift source and shift target registers within a same register file during a same cycle.

As depicted in FIG. 2 note that during a shift sequence an execution lane will shift content out from its register file 202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 203, 204 observed in FIG. 2 is incorporated into the design of FIG. 2. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non shifted content that is not replaced with shifted in content persists local to the execution lane across the shifting cycle. A memory execution unit, not shown in FIG. 2 for illustrative ease, may also exist in each execution lane 201 to load/store data from/to the random access memory space that is associated with the execution lane's row and/or column within the execution lane array. Here, the memory unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit 205 of the hardware execution lane 201, in various embodiments, the mathematical opcodes supported by the ALU unit 205 may include any of the following ALU operations: add (ADD), substract (SUB), move (MOV), multiple (MUL), multiply-add (MAD), absolute value (ABS), divide (DIV), shift-left (SHL), shift-right (SHR), return min or max (MIN/MAX), select (SEL), logical AND (AND), logical OR (OR), logical XOR (XOR), count leading zeroes (CLZ or LZC) and a logical complement (NOT). An embodiment of an ALU unit 205 or portion thereof described in more detail below with respect to FIGS. 3 through 5. As described just above, memory access instructions can be executed by the execution lane 201 to fetch/store data from/to their associated random access memory. Additionally the hardware execution lane 201 supports shift op instructions (right, left, up, down) to shift data within the two dimensional shift register structure. As described above, program control instructions are largely executed by the scalar processor of the stencil processor.

Figure 3:
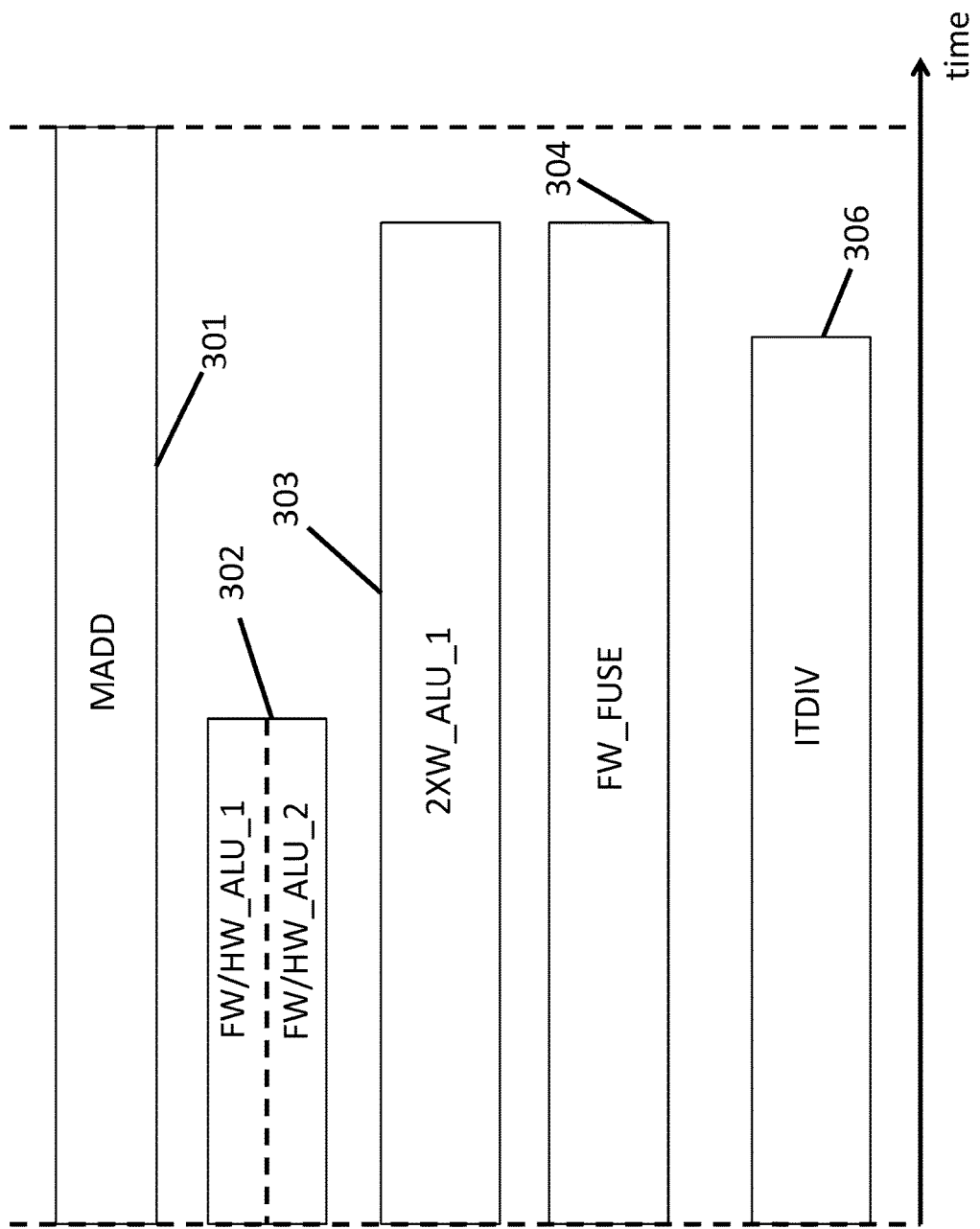
FIG. 3 shows relative delay of functions performed by an embodiment of the execution lane of FIG. 2.

FIG. 3 shows a consumption time map for an execution unit, or portion thereof, of an execution lane as described just above. Specifically, FIG. 3 maps out the amount of time consumed by each of a number of different instructions that can be executed by the execution unit. As observed in FIG. 3, the execution unit can perform: 1) a multiply-add instruction (MAD) 301; 2) two full width (FW) or four half width (HW) ALU operations in parallel 302; 3) a double width (2×W) ALU operation 303; 4) a FUSED operation of the form ((C op D) op B) 304; and, 5) an iterative divide (DIV) operation 306.

As observed in FIG. 3, the MAD operation 301, by itself, consumes the most time amongst the various instructions that the execution unit can execute. As such, a design perspective is that the execution unit can be enhanced with multiple ALU logic units, besides the logic that performs the MAD operation, to perform, e.g., multiple ALU operations in parallel (such as operation 302) and/or multiple ALU operations in series (such as operation 304).

Figure 4:
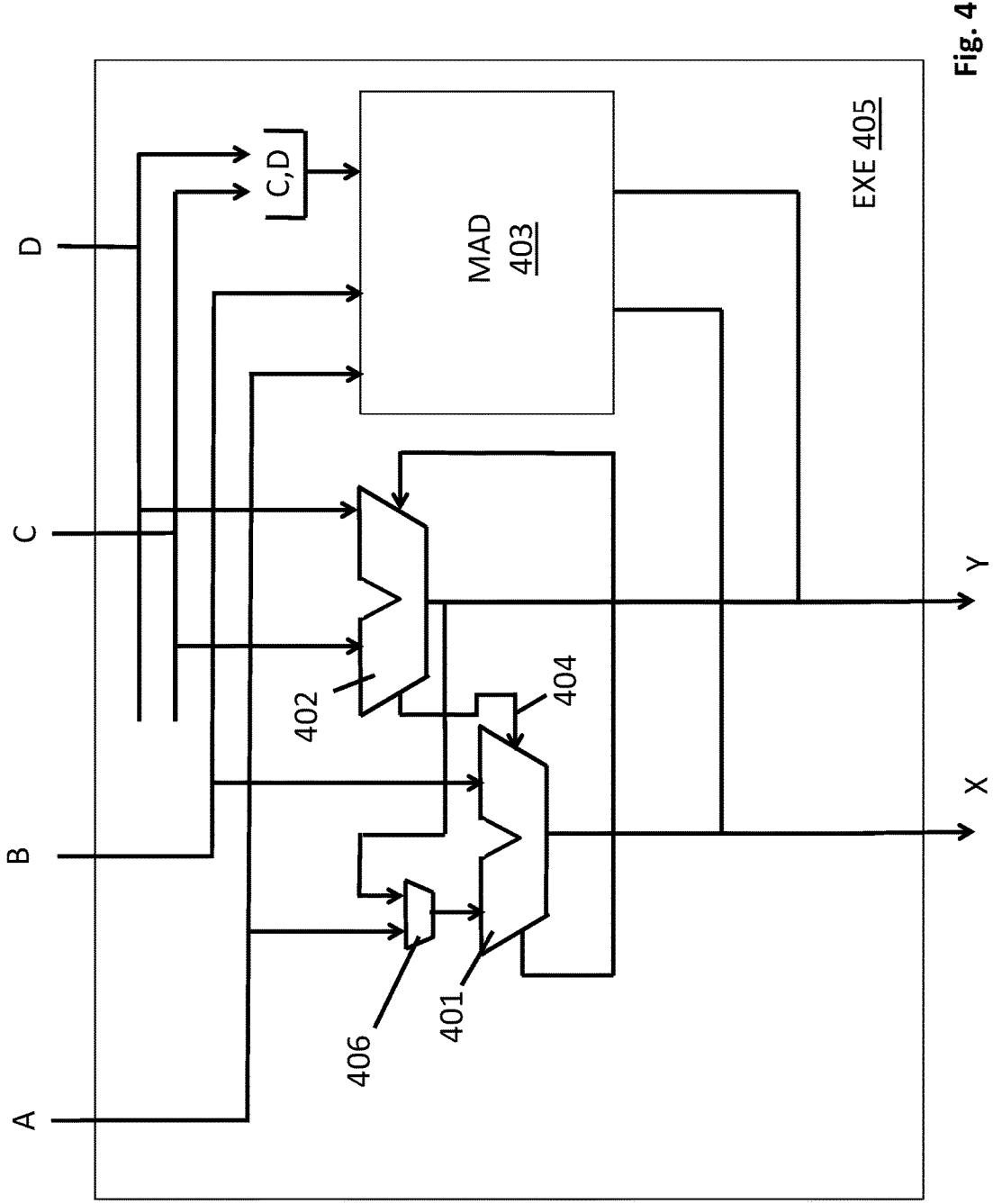
FIG. 4 shows a design for a multi-functional execution lane.

FIG. 4 shows an embodiment of a design for an execution unit 405 that can support the different instructions illustrated in FIG. 3. As observed in FIG. 4, the execution unit 405 includes a first ALU logic unit 401 and a second ALU logic unit 402 as well as a multiply-add logic unit 403. Inputs from the register file are labeled A, B, C, D while outputs written back to the register file are labeled X and Y. As such, the execution unit 405 is a 4 input port, 2 output port execution unit.

The multiply add logic unit 403, in an embodiment, performs a full multiply-add instruction. That is, the multiply-add logic unit 403 performs the function (A*B)+(C,D) where A is a full width input operand, B is a full width operand and (C,D) is a concatenation of two full width operands to form a double width summation term. For example, if full width corresponds to 16 bits, A is 16 bits, B is 16 bits and the summation term is 32 bits. As is understood in the art, a multiply add of two full width values can produce a double width resultant. As such, the resultant of the MAD operation is written across the X, Y output ports where, e.g., X includes the top half of the resultant and Y includes the bottom half of the resultant. In a further embodiment the multiply-add unit 403 supports a half width multiply add. Here, e.g., the lower half of A is used as a first multiplicand, the lower half of B is used as a second multiplicand and either C or D (but not a concatenation) is used as the addend.

As mentioned above with respect to FIG. 3, the execution of the MAD operation may consume more time than a typical ALU logic unit. As such, the execution unit includes a pair of ALU logic units 401, 402 to provide not only for parallel execution of ALU operations but sequential ALU operations as well.

Here, referring to FIGS. 3 and 4, with respect to the dual parallel FW operation 302, the first ALU logic unit 401 performs the first full-width ALU operation (A op B) while the second ALU performs the second full-width ALU operation (C op D) in parallel with the first. Again, in an embodiment, full width operation corresponds to 16 bits. Here, the first ALU logic unit 401 writes the resultant of (A op B) into register X while the second ALU logic unit 402 writes the resultant of (C op D) into register Y.

In an embodiment, the instruction format for executing the dual parallel full width ALU operation 302 includes an opcode that specifies dual parallel full width operation and the destination registers. In a further embodiment, the opcode, besides specifying dual parallel full width operation, also specifies one or two ALU operations. If the opcode only specifies one operation, both ALU logic units 401, 402 will perform the same operation. By contrast if the opcode specifies first and second different ALU operations, the first ALU logic unit 401 performs one of the operations and the second ALU logic unit 402 performs the second of the operations.

With respect to the half width (HW) feature of operation 302, four half width ALU operations are performed in parallel. Here, each of inputs A, B, C and D are understood to each include two separate input operands. That is, e.g., a top half of A corresponds to a first input operand, a lower half of A corresponds to a second input operand, a top half of B corresponds to a third input operand, a lower half of B corresponds to a fourth input operand, etc.

As such, ALU logic unit 401 handles two ALU operations in parallel and ALU logic unit 402 handles two ALU operations in parallel. Thus, during execution, all four half width operations are performed in parallel. At the end of the operation 302, ALU logic unit 401 writes two half width resultants into register X and ALU logic unit 402 writes two half width resultants into register Y. As such, there are four separate half width resultants in registers X and Y.

In an embodiment, the instruction format not only specifies that parallel half width operation is to be performed but also specifies which ALU operation(s) is/are to be performed. In various embodiments the instruction format may specify that all four operations are the same and only specify one operation and/or may specify that all four operations are different and specify four different operations. In the case of the later, alternatively, to effect same operations for all four operations the instructions format may specify the same operation four times. Various combinations of these instruction format approaches are also possible.

With respect to the double wide ALU operation 303 of FIG. 3, in an embodiment, the execution unit 405 performs the operation (A,C) op (B,D) where (A,C) is a concatenation of inputs A and C that form a first double wide input operand and (B,D) is a concatenation of inputs B and D that form a second double wide input operand. Here, a carry term may be passed along carry line 404 from the first ALU logic unit 401 to the second ALU logic unit 402 to carry operations forward from full width to double width.

That is, in an embodiment, the C and D terms represent the lowered ordered halfs of the two double wide input operands. The second ALU logic unit 402 performs the specified operation (e.g., ADD) on the two lower halfs and the resultant that is generated corresponds to the lower half of the overall double wide resultant. As such, the resultant from the second ALU logic unit 402 is written into register Y. The operation on the lower halves may generate a carry term that is carried to the first ALU logic unit 401 which continues the operation of the two respective upper halves A and C of the input operands. The resultant from the first ALU logic unit 401 corresponds to the upper half of the overall resultant which is written into output register X. Because operation on the upper halves by the first ALU logic unit 401 may not be able to start until it receives the carry term from the second ALU logic unit 402, the operation of the ALU logic units 402, 401 is sequential rather than parallel. As such, as observed in FIG. 3, double width operations 303 may take approximately twice as long as parallel full/half width operations 302.

Nevertheless, because the MAD operation 301 can consume more time than two consecutive ALU logic unit operations, the machine can be built around an execution unit 405 that can attempt to insert as much function as it can into the time period consumed by its longest propagation delay operation. As such, in an embodiment, the cycle time of the execution unit 405 corresponds to the execution time of the MAD instruction 301. In an embodiment, the instruction format for a double wide operation specifies not only the operation to be performed, but also, that the operation is a double wide operation.

With respect to the FUSED operation 304, the execution unit 405 performs the operation (C op D) op B. Here, like the double wide ALU operation 303 discussed just above, the dual ALU logic units 401, 402 operate sequentially because the second operation operates on the resultant of the first operation. Here, the second ALU logic unit 402 performs the initial operation on full width inputs C and D. The resultant of the second ALU logic 402, instead of being written into resultant register space, is instead multiplexed into an input of the first ALU logic unit 401 via multiplexer 406. The first ALU logic unit 401 then performs the second operation and writes the resultant into register X.

In a further embodiment, a half width FUSED operation can also be performed. Here, operation is as described above except that only half of the input operands are utilized. That is, for example, in calculating (C op D) op B, only the lower half of C and the lower half of D are used to determine a half width result for the first operation, then, only the lower half of B is used along with the half width resultant of the first operation to perform the second operation. The resultant is written as a half width value in register X. Further still, two half width FUSED operations can be performed in parallel. Here, operation is as described just above simultaneously with the same logical operations but for the high half of the operands. The result is two half with values written into register X.

In an embodiment, the instruction format for a FUSED operation specifies that a FUSED operation is to be performed and specifies the two operations. If the same operation is be performed twice, in an embodiment, the instruction only specifies the operation once or specifies it twice. In a further embodiment, apart from specifying FUSED operation and the operation(s) to be performed, the instruction format may further specify whether full width or half width operation is to be performed.

Operation 306 of FIG. 3 illustrates that an iterative divide operation can also be performed by the execution unit. In particular, as explained in more detail below, in various embodiments both ALU logic units 401, 402 collaboratively participate in parallel during the iterative divide operation.

Figure 5A:
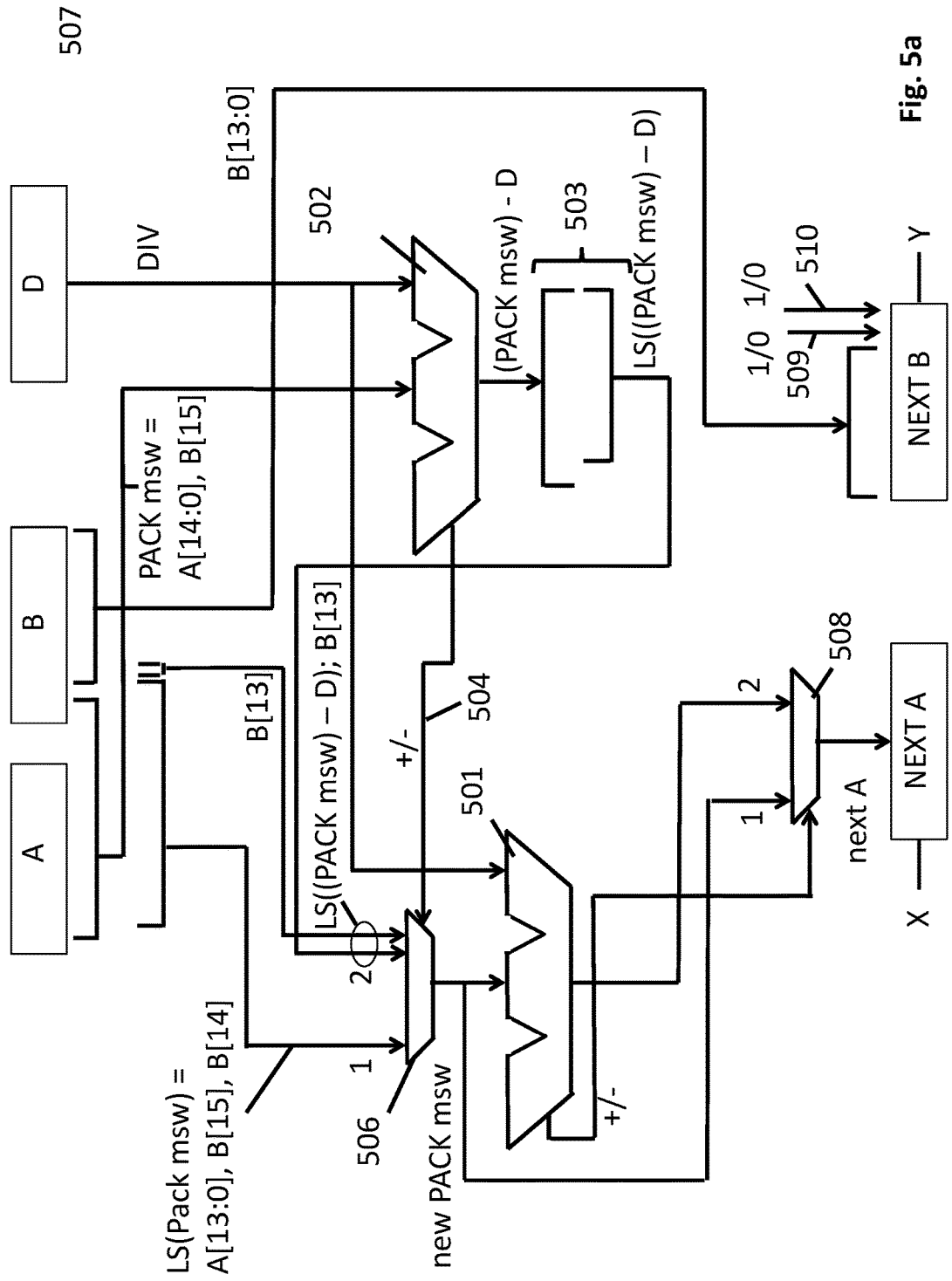
FIGS. 5a and 5b show circuitry and a methodology to perform an iterative divide operation.
Figure 5B:
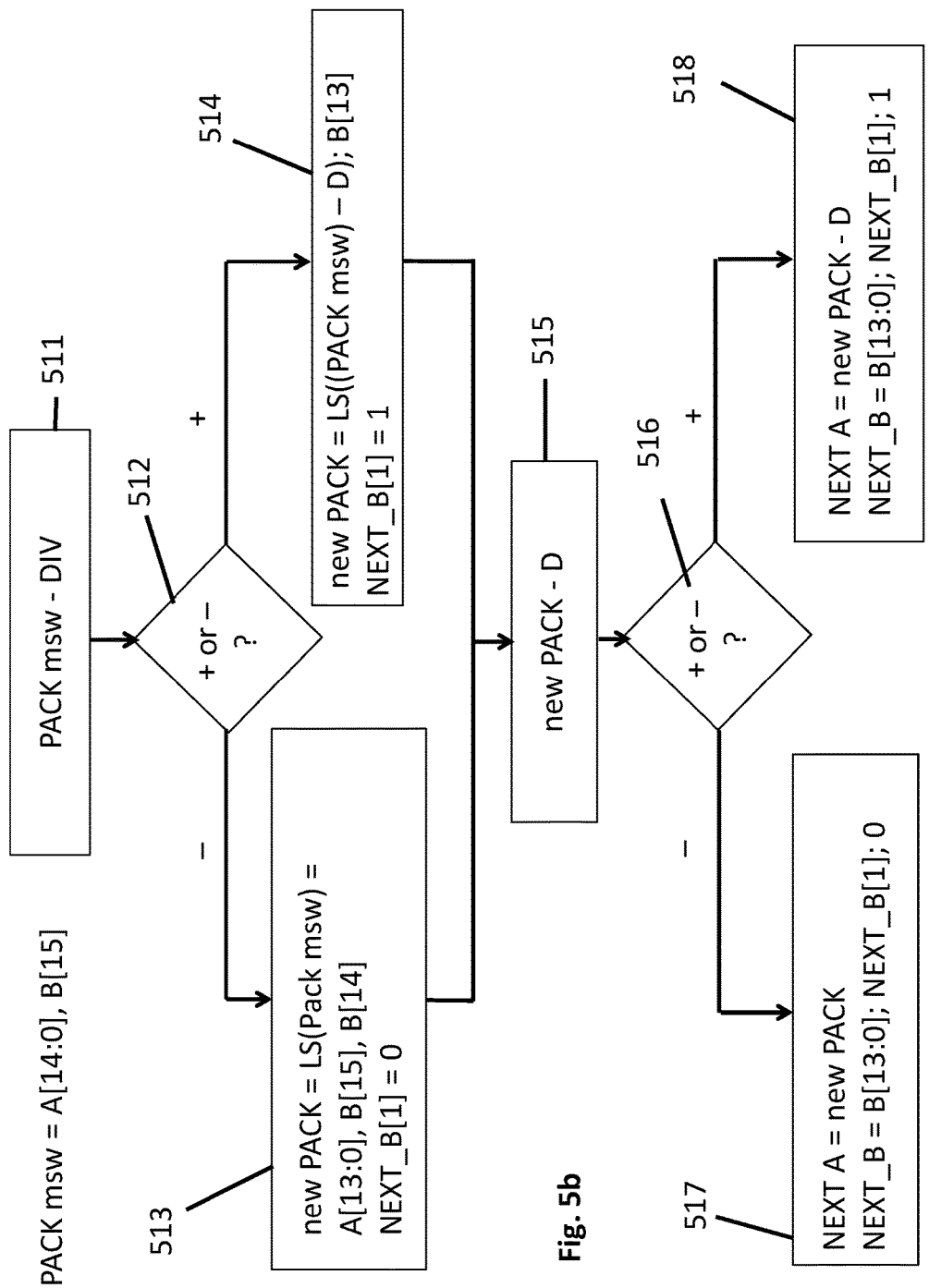

FIGS. 5a and 5b pertain to an embodiment for executing the iterative divide instruction 306 of FIG. 3. FIG. 5a shows additional circuitry to be added to the execution unit circuitry 405 of FIG. 4 to enable execution of the iterative divide instruction (with the exception of the ALU logic units 501, 502 which are understood to be the same ALU logic units 401, 402 of FIG. 4). FIG. 5b shows an embodiment of the micro-sequence operation of the execution unit during execution of the iterative divide instruction. As will be more clear from the following discussion, a single execution of the instruction essentially performs two iterations that are akin to the atomic act of long division in which an attempt is made to divide the leading digit(s) of a numerator (the value being divided into) by a divisor (the value being divided into the numerator).

For simplicity, 16 bit division will be described (those of ordinary skill will be able to extend the present teachings to different width embodiments). With the embodiment described herein performing two long division atomic acts, eight sequential executions of the instruction are used to fully divide a 16 bit numerator by a 16 bit divisor. That is, each atomic long division act corresponds to the processing of a next significant bit of the numerator. Two such significant bits are processed during a single execution of the instruction. Therefore, in order to process all bits of the numerator, eight sequential executions of the instruction are needed to fully perform the complete division. The output of a first instruction is written to the register file and used as the input for the next subsequent instruction.

Referring to FIG. 5a, the numerator input is provided at the B input and the divisor is presented at the D input. Again, in the present embodiment, both of the B and D input operands are 16 bits. A "packed" 32 bit data structure "PACK" that is a concatenation A, B of the A and B input operands (the A operand is also 16 bits) can be viewed as an initial data structure of a complete division process. As an initial condition A is set to a string of sixteen zeroes (000 . . . 0) and B is the numerator value.

Referring to FIGS. 5a and 5b, during a first microsequence, a left shift of the PACK data structure is performed to create a data structure A[14:0], B[15], referred to as the most significant word of PACK ("PACK msw"). The divisor D is then subtracted 511 from PACK msw by the second ALU logic unit 502. This operation corresponds to long division where the divisor is initially divided into the leading digit of the numerator. Note that in an embodiment, the ALU logic units 501, 502 are actually three input ALUs and not two input ALUs as suggested by FIG. 4 (the third input is reserved for the divisor D for the iterative divide operation).

Different data processing procedures are then followed depending on the sign 512 of the result of the subtraction 511. Importantly, the first quotient resultant bit (i.e., the first bit of the division result) is staged to be written into the second to least significant bit of the Y output port 509 ("NEXT B[1]"). If the result of the subtraction is negative, the quotient resultant bit B[1] is set 513 to a 0. If the result of the subtraction is positive, the quotient resultant bit B[1] is set 514 to a 1. The setting of this bit corresponds to the process in long division where the first digit of the quotient result is determined by establishing whether or not the divisor value can be divided into the first digit of the numerator.

Additionally, two different data structures are crafted and presented to respective input ports ("1", "2") of a multiplexer 506 (which may be the same multiplexer as multiplexer 406 of FIG. 4). The first data structure corresponds to a left shift of Pack msw (A[13:0], B[15], B[14]) and is presented at input 1 of the multiplexer 506. The creation of this data structure corresponds to the process in long division where the next digit of the numerator is appended to its most significant neighbor if the divisor does not divide into the most significant neighbor.

The second crafted data structure corresponds to a left shift of the result of the subtraction 511 that was just performed by the second ALU logic unit 502 appended with bit B[13] and is presented at the second input ("2") of the multiplexer 506. The creation of this data structure corresponds to the situation in long division where a divisor divides into the first digit(s) of the numerator which sets up a next division into the result of the difference between first digit(s) of the numerator and a multiple of the divisor.

The first or second data structures are then selected by the multiplexer 506 depending on whether the result of the subtraction performed by the second ALU logic unit 502 yielded a positive or negative result. If the subtraction yielded a negative result (which corresponds to the divisor not being able to be divided into the next significant digit of the numerator), the first data structure is selected 513. If the subtraction yielded a positive result (which corresponds to the divisor being able to be divided into the next significant digit of the numerator), the second data structure is selected 514.

The output of the multiplexer 506 is now understood to be the new most significant word of the PACK data structure (new PACK msw) and corresponds to the next value in a long division sequence that the divisor is to be attempted to be divided into. As such, the first ALU logic unit 501 subtracts 515 the divisor D from the new PACK msw value. The least significant bit 510 of the Y output B[0] is staged to be written as a 1 or a 0 depending on the sign of the subtraction result from the first ALU 501 and represents the next digit in the quotient resultant 517, 518.

A second multiplexer 508 selects between first and second data structures depending 516 on the sign of the first ALU logic unit's subtraction 515. A first data structure, presented at input "1" of the second multiplexer 508, corresponds to the new PACK msw value. A second data structure, presented at input "2" of the second multiplexer 508, corresponds to the result of the subtraction performed by the first ALU logic unit 501. Which of the two data structures is selected depends on the sign of the result of the subtraction 515 performed by the first ALU 501. If the result of the subtraction is negative, the multiplexer selects the new PACK msw value 517. If the result of the subtraction is positive, the multiplexer selects the new PACK msw-D value 518.

The output of the second multiplexer 508 corresponds to the NEXT A value which is written into the register file from the X output. The value presented at the Y output (B[15:0]) is composed at the leading edge of the B operand less its two most significant bits that were consumed by the two just performed iterations (B[13:0]). The concatenation of these remainder bits of B with the two newly calculated quotient digit resultants are written into the register file as the new B operand NEXT B. For a next iteration, the X output from the previous instruction is read into the A operand and the Y output from the previous instruction is read into the B operand. The process then repeats until all digits of the original B operand have been processed (which, again, in the case of a 16 bit B operand will consume eight sequential executions of the instruction). At the conclusion of all iterations, the final quotient will be written into the register file from the Y output and any remainder will be represented in the NEXT A value which is written into the register file from the X output.

FIG. 6 shows an embodiment of a methodology performed by the ALU unit described above. As observed in FIG. 6 the method includes performing the following with an ALU unit of an image processor. Executing a first instruction, the first instruction being a multiply add instruction 601. Executing a second instruction including performing parallel ALU operations with first and second ALU logic units operating simultaneously to produce different respective output resultants of the second instruction 602. Executing a third instruction including performing sequential ALU operations with one of the ALU logic units operating from an output of the other of the ALU logic units to determine an output resultant of the third instruction 603. Executing a fourth instruction including performing an iterative divide operation in which the first ALU logic unit and the second ALU logic unit operate to determine first and second division resultant digit values 604.

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

Figure 7:
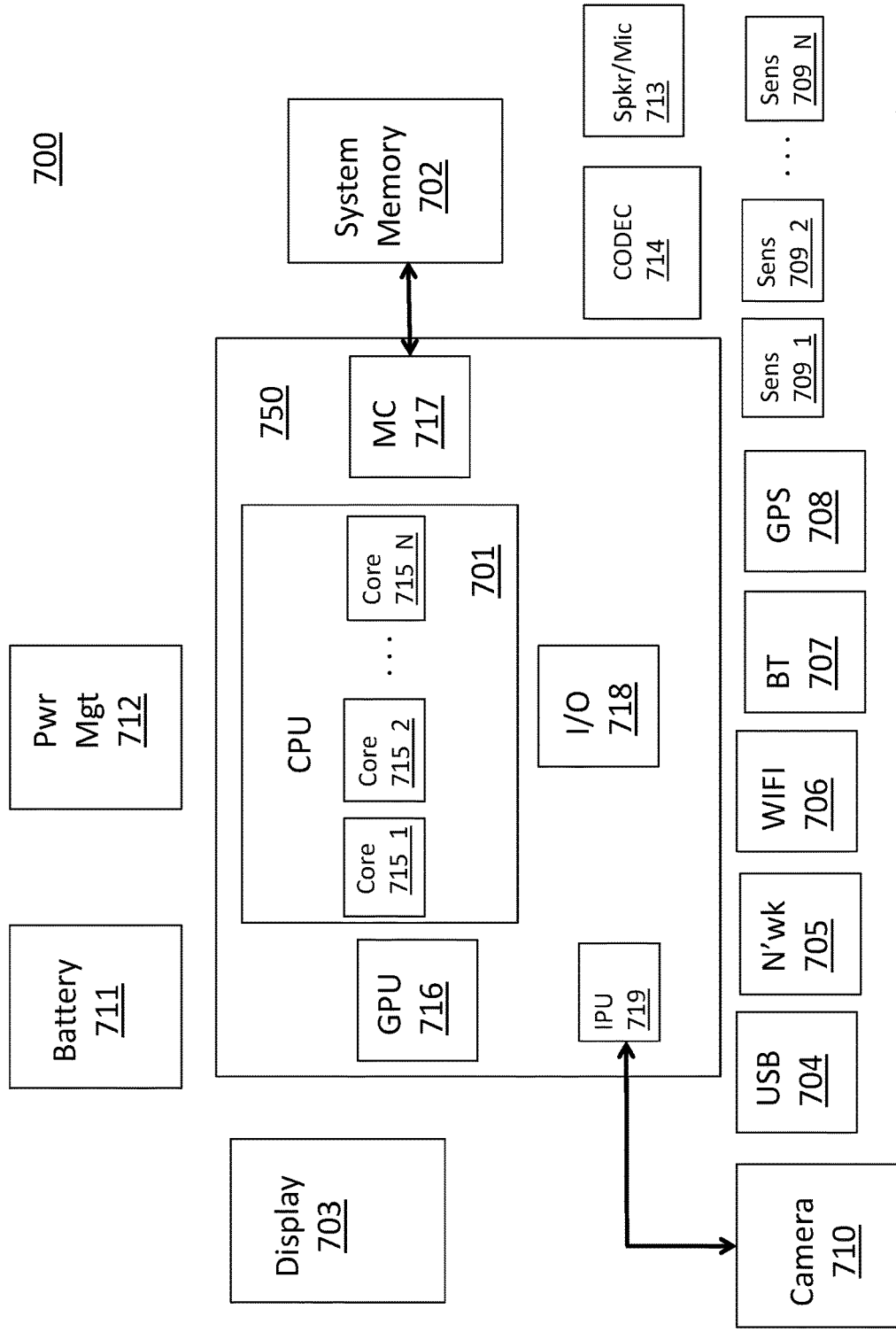
FIG. 7 shows an embodiment of a computing system.

FIG. 7 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 7, the basic computing system may include a central processing unit 701 (which may include, e.g., a plurality of general purpose processing cores 715_1 through 715_N and a main memory controller 717 disposed on a multi-core processor or applications processor), system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_N, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller), an I/O control function 718 and an image processing unit 719. The general purpose processing cores 715 typically execute the operating system and application software of the computing system. The graphics processing units 716 typically execute graphics intensive functions to, e.g., generate graphics information that is presented on the display 703. The memory control function 717 interfaces with the system memory 702 to write/read data to/from system memory 702. The power management control unit 712 generally controls the power consumption of the system 700.

The image processing unit 719 may be implemented according to any of the image processing unit embodiments described at length above in the preceding sections. Alternatively or in combination, the IPU 719 may be coupled to either or both of the GPU 716 and CPU 701 as a co-processor thereof. Additionally, in various embodiments, the GPU 716 may be implemented with any of the image processor features described at length above.

Each of the touchscreen display 703, the communication interfaces 704-707, the GPS interface 708, the sensors 709, the camera 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750.

In an embodiment one or more cameras 710 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An image processor comprising an array of processing units, wherein each processing unit of the array of processing units comprises:
   four input ports and two output ports;
   a first arithmetic-logic unit (ALU) and a second ALU configured to perform two full-width ALU operations at least partially in parallel, during which:
      the first ALU is configured to receive data from a first pair of input ports, to perform a first full-width ALU operation, and to provide a first full-width output to a first output port of the two output ports, and
      the second ALU is configured to receive data from a second pair of input ports, to perform a second full-width ALU operation, and to provide a second full-width output to a second output port of the two output ports; and
   a multiply-add logic unit configured to receive data from three or more of the four input ports, the data including a first multiply operand received from a first input port, a second multiply operand received from a second input port, and a summation term received from one or more other input ports, to perform a multiply-add operation comprising a multiplication of the first multiply operand by the second multiply operand and a summation operation of a result of the multiplication with the summation term, and to provide a double-width output across both of the two output ports.

2. The image processor of claim 1, wherein a cycle time of each processing unit is based on an execution time of the multiply-add operation.

3. The image processor of claim 1, wherein the first ALU and the second ALU of each processing unit are further configured to perform a double-width ALU operation, during which:
   the first ALU is configured to receive data from the first pair of input ports, to perform a third full-width ALU operation corresponding to a lower half of the double-width ALU operation, and to provide the lower half of the double-width ALU operation to one of the two output ports;
   the second ALU is configured to receive data from the second pair of input ports, to perform a fourth full-width ALU operation corresponding to an upper half of the double-width ALU operation, and to provide the upper half of the double-width ALU operation to another of the two output ports; and
   the first ALU is configured to provide, to the second ALU, a carry term generated from the third full-width ALU operation.

4. The image processor of claim 1, wherein the first ALU and the second ALU of each processing unit are further configured to perform four half-width ALU operations at least partially in parallel, during which:
   the first ALU and the second ALU are each configured to receive input operands from a respective pair of input ports, to perform a first half-width operation on a lower half of each of the input operands, to perform a second half-width operation on an upper half of each of the input operands, and to write the result to a respective one of the two output ports.

5. The image processor of claim 1, wherein the first ALU and the second ALU of each processing unit are configured to perform a pair of operations in serial, in which one of the ALUs provides a result of one of the pair of operations as input to another of the ALUs as input to another of the pair of operations.

6. The image processor of claim 1, wherein the first ALU and the second ALU of each processing unit are further configured to perform a fused operation comprising a second operation performed serially on the result of a first operation, during which:
   the first ALU is configured to receive data from the first pair of input ports, to perform the first operation, and to provide a result of the first operation to the second ALU; and
   the second ALU is configured to receive data from one input port of the second pair of input ports and to receive the result of the first operation from the first ALU, to perform the second operation, and to provide a result of the second operation to one of the two output ports.

7. The image processor of claim 6, wherein each processing unit comprises a multiplexor that is configured to select an input between a first input port and a result generated by the first ALU and to provide the selected input as input to the second ALU.

8. The image processor of claim 1, wherein each processing unit is configured to receive an instruction that specifies an opcode representing one or two ALU operations, and wherein if the opcode represents one ALU operation, the processing unit is configured to cause both the first ALU and the second ALU to perform the same operation, and wherein the processing unit is configured to cause the first ALU and the second ALU to perform different operations otherwise.

9. The image processor of claim 1, wherein each processing unit is configured to use the first ALU and the second ALU to perform an iterative divide process,
   wherein the first ALU is configured to receive a numerator of the iterative divide process on a first input port of the four input ports, to receive a divisor of the iterative divide process on a second input port of the four input ports, to perform a first subtraction operation that subtracts the divisor from an intermediate result,
   wherein the second ALU is configured to receive a left-shifted result of the first subtraction operation, and to perform a second subtraction operation that subtracts the divisor from the left-shifted result of the first subtraction operation.

10. A method implemented by a processing unit of an image processor comprising an array of processing units, the method comprising:
   performing, by a first arithmetic-logic unit (ALU) and a second ALU of the processing unit, a first full-width ALU operation and a second full-width ALU operation at least partially in parallel, including:
      receiving, by the first ALU, data from a first pair of input ports of the processing unit,
      performing, by the first ALU, the first full-width ALU operation using the data received from the first pair of input ports of the processing unit,
      providing, by the first ALU, a first full-width output to a first output port of the processing unit,
      receiving, by the second ALU, data from a second pair of input ports of the processing unit,
      performing, by the second ALU, the second full-width ALU operation using the data received from the second pair of input ports of the processing unit, and
      providing, by the second ALU, a second full-width output to a second output port of the processing unit; and
   performing, by a multiply-add logic unit of the processing unit, a multiply-add operation including:

receiving, by the multiply-add logic unit, data from three or more input ports of the processing unit, the data including a first multiply operand received from a first input port, a second multiply operand received from a second input port, and a summation term received from one or more other input ports, performing, by the multiply-add logic unit, a multiply-add operation comprising a multiplication of the first multiply operand by the second multiply operand and a summation operation of a result of the multiplication with the summation term, and providing, by the multiply-add logic unit, a double-width output across two output ports of the processing unit.

11. The method of claim 10, wherein a cycle time of the processing unit is based on an execution time of the multiply-add operation.

12. The method of claim 10, further comprising:
performing, by the first ALU and the second ALU of the processing unit, a double-width ALU operation, including:
receiving, by the first ALU, data from the first pair of input ports,
performing, by the first ALU, a third full-width ALU operation corresponding to a lower half of the double-width ALU operation,
providing, by the first ALU, the lower half of the double-width ALU operation to one of two output ports of the processing unit;
providing, by the first ALU to the second ALU, a carry term generated from performing the third full-width ALU operation,
receiving, by the second ALU, data from the second pair of input ports and the carry term from the first ALU,
performing, by the second ALU, a fourth full-width ALU operation corresponding to an upper half of the double-width ALU operation, and
providing, by the second ALU, the upper half of the double-width ALU operation to another of the two output ports of the processing unit.

13. The method of claim 10, further comprising:
performing, by the first ALU and the second ALU of the processing unit, four half-width ALU operations at least partially in parallel, including:
receiving, by the first ALU and the second ALU, input operands from a respective pair of input ports of the processing unit,
performing, by the first ALU and the second ALU, a first half-width operation on a lower half of each of the input operands,
performing, by the first ALU and the second ALU, a second half-width operation on an upper half of each of the input operands, and
writing, by the first ALU and the second ALU, a result to a respective one of the two output ports of the processing unit.

14. The method of claim 10, further comprising:
performing, by the first ALU and the second ALU of the processing unit, a pair of operations in serial, including providing, by one of the ALUs, a result of one of the pair of operations as input to another of the ALUs as input to another of the pair of operations.

15. The method of claim 14, further comprising:
performing, by the first ALU and the second ALU of the processing unit, a fused operation comprising a second operation performed serially on a result of a first operation, including:
receiving, by the first ALU, data from the first pair of input ports,
performing, by the first ALU, the first operation,
providing, by the first ALU, a result of the first operation to the second ALU,
receiving, by the second ALU, data from one input port of the second pair of input ports,
receiving, by the second ALU, the result of the first operation from the first ALU,
performing, by the second ALU, the second operation, and
providing, by the second ALU, a result of the second operation to one of the two output ports.

16. The method of claim 15, wherein the processing unit comprises a multiplexor, and further comprising:
selecting, by the multiplexor, an input between a first input port and a result generated by the first ALU, and
providing, by the multiplexor, the selected input as input to the second ALU.

17. The method of claim 10, further comprising:
receiving, by the processing unit, an instruction that specifies an opcode representing one or two ALU operations; and
based on determining that the opcode represents one ALU operation, causing both the first ALU and the second ALU to perform the same operation.

18. The method of claim 10, further comprising:
receiving, by the processing unit, an instruction that specifies an opcode representing one or two ALU operations; and
based on determining that the opcode represents two ALU operations, causing the first ALU and the second ALU to perform different operations.

19. The method of claim 10, further comprising:
performing an iterative divide process using the first ALU and the second ALU including:
receiving, by the first ALU, a numerator of the iterative divide process on a first input port,
receiving, by the first ALU, a divisor of the iterative divide process on a second input port,
performing, by the first ALU, a first subtraction operation that subtracts the divisor from an intermediate result,
receiving, by the second ALU, a left-shifted result of the first subtraction operation,
performing, by the second ALU, a second subtraction operation that subtracts the divisor from the left-shifted result of the first subtraction operation.

* * * * *

UNITED STATES PATENT AND TRADEMARK OFFICE
CERTIFICATE OF CORRECTION

PATENT NO. : 10,185,560 B2
APPLICATION NO. : 15/591955
DATED : January 22, 2019
INVENTOR(S) : Vasilyev et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 56 days.

Signed and Sealed this
Twenty-seventh Day of August, 2019

Andrei Iancu
*Director of the United States Patent and Trademark Office*